UNITED STATES PATENT OFFICE.

GEORGE W. SCOLLAY, OF ST. LOUIS, MISSOURI.

IMPROVEMENT IN PRESERVING MEAT AND ANIMAL MATTER FOR FOOD, &c.

Specification forming part of Letters Patent No. 147,984, dated February 24, 1874; application filed August 18, 1873.

*To all whom it may concern:*

Be it known that I, GEORGE WASHINGTON SCOLLAY, of the city and county of St. Louis, and State of Missouri, (at present residing in the city of New York,) have invented certain new and useful Improvements in the Means, Mode, or Method of Preserving Meat and Animal Matter; in keeping it sweet and fresh, that it may be used for food or any other purpose where it can or may be useful; and I do hereby declare the following to be such a full, clear, and exact description of the same, as will enable any one skilled in the arts to which my invention most nearly appertains to use and practice the same.

The principal object of my invention is to preserve animal carcasses, meat, or matter sweet and fresh—either unpacked or when packed in close or open vessels or packages—that it may be used for food months after the animal has been slaughtered; by which means it is made possible and commercially safe to slaughter and pack animal matter or meat in a part of the world where it is abundant and cheap, and transport it to densely-populated countries where it is scarce and dear.

My invention consists, first, of a novel method of treating or preparing the blood of the animal, by which it is made or maintained in a fluid state, kept from separating or putrefying, and rendered an antiseptic influence upon the animal meat or matter subjected to its action or influence; second, of a novel method of treating or preparing the vegetable proteine compounds, by which they are rendered antiputrescent, and an antiseptic influence upon animal flesh or tissue, treated with it, or immersed in it, or subjected to its influence; third, of immersing, packing, dipping, or treating the flesh or tissue of the animal into or with the blood or proteine compounds thus treated or prepared, for the purpose of preserving the same; fourth, of preparing the carcass of the animal for the more effectual preservation of the same, in or by the prepared blood or proteine compounds, by introducing into the arterial and venous systems thereof an antiseptic gas or vapor, and an antiseptic fluid, either separately or in combination, or a gas or vapor and fluid, which, being so introduced in the venous and arterial systems, or incorporated with the tissue, will unite and exert an antiseptic influence upon the flesh and tissues of the body, or any part thereof; fifth, of combining the internal and external application of the aforesaid antiseptic influence to animal matter, for the purpose of preserving the same, all of which are hereinafter described.

The proteine compounds of which the blood is in part composed are so proportioned that the soluble parts of organized blood or flesh are not soluble in blood which has been acted upon in such a way as to convert the albumen into albuminose or proteine, and otherwise rendered antiputrescent. The blood when it has been thus acted upon does not coagulate nor separate, but remains in a fluid state for a long time without changing, and meat or portions of animal tissue immersed in it or thoroughly subjected to its influence is preserved in a very natural state. To get the blood in this state, it is first subjected to the action of any of the gases or vapors that are known to be color-restoring, antiseptic, and harmless in their effect upon animal matter to be used for food, and these gases may be introduced into the blood separately or mixed, and the blood during the introduction of the gases should be continually agitated. The gases which I prefer to use for this purpose are carbonic-oxide and sulphurous-acid gas, either separately or combined. I prefer to use them in combination, the sulphurous to follow the carbonic oxide, or they may be introduced together, both gases flowing into a common pipe leading to the reservoir of blood. The flow of the gas should be continued until the blood is thoroughly fluid, and color restored. After the blood has been brought to this state, there is added to it, first, about two ounces of a neutralized solution to about eight ounces of blood, the solution to be of about $23\frac{1}{2}°$ to $24°$ of Baumé in strength, and composed of any of the alkalies or alkaline bases neutralized with sulphurous-acid gas very slightly impregnated with creosote or carbolic-acid vapor, which should be mixed with the sulphurous-acid gas before it unites with the alkalies, of which soda, potash, or ammonia are preferable.

In place of the neutralized salts used in making the solution above described, the bisalts may be used, though the neutral are preferable. After this solution of blood and neutralized salts has been prepared, substantially as aforesaid, there is added to it from fifteen to twenty grains of hydrochlorate of ammonia, which last, however, may be omitted, though it serves a very good purpose.

After the blood has been thus prepared, there are various ways in which the flesh and tissues of the animal may be subjected to its influence, and there are various ways in which the flesh of the animal may and sometimes is treated by me before it is brought under the influence of this blood solution, or any solution which I use, or a substitute for it. Thus, for example, after the animal is slaughtered, the color-restoring and antiseptic gases may be introduced into the arterial and venous systems, prepared and introduced into the animal in substantially the same way they are prepared and introduced into the blood, as above described, and the gas may be followed by an injection of the neutralized solution into the arterial and venous systems, the solution to be made of blood, as above described; or a solution may be made of water and the salts neutralized as aforesaid, and injected in the animal's arterial and venous systems, after the same have been injected with the gas, as aforesaid; or the animal may be infiltrated with the prepared blood, or blood solution above described, omitting the gas-injection.

This preparation of the animal flesh or tissue, however, may be omitted, and the flesh and tissue cut to the required size, and packed in the prepared blood in packages of the desired sizes.

If the animal is cut in larger pieces, however—say, a quarter of beef in two or three pieces—the prepared blood should be made stronger with the antiseptic influence — say, twice as strong as that above described—thus relying upon the prepared blood to keep or preserve the meat packed in it without the aid of previous preparation of the meat.

This plan will be found entirely efficient when the meat is cut in comparatively small pieces, and packed in comparatively small packages, and will probably preserve the meat cut in larger pieces and packed in casks holding from four to five hundred pounds each. But where it is the purpose to pack meat in hot and humid atmospheres for shipment to remote points, it is best to first treat the carcass in one of the methods above described; and the best method is, first, to inject the gases, and follow it or them with an infiltration of the blood solution, or the neutral solution, and afterward dress and cut up the meat, and pack it in the prepared blood in packages of from one pound to tierces of five hundred pounds each.

I do not intend to confine my claim or patent to the method above described of preparing the blood; nor to the method of making the neutral solution; nor to the method of carbolating the gases; nor to the uses of the gases above enumerated; nor to the use of the salts or bisalts above enumerated; nor to the method of neutralizing the alkalies; nor do I intend to confine my patent or claim to the preparation and use of the animal proteine compound to pack the meat in, or to infiltrate it with, as the vegetable proteine compounds may be selected in their proper proportions, and subjected to the same treatment as the animal, with a proper percentage of water added; and these compounds may be used in the same way, substantially, and for the same purpose as the animal compounds of like character; and I do use them when the supply of blood is not sufficient, and I have found that blood may be made to keep in several ways, after the action of the gas upon it, or even without the action of the gas; and other gases may be used, either with or after those above specified; and any of the alkalies or alkaline bases carbolated may be used for this purpose, as may, also, the acetates or silicates of the alkalies, of which soda is best; and also boracic acid, the borates, and the biborates of the alkalies; and there are other combinations and methods of and for putting the blood in this state, and of making these solutions and gases, which it is not necessary to enumerate here; but the best way of preparing the blood or other solution is that first above described, to insure the most natural color and taste of the flesh.

The essential principle in the invention is to keep the blood in a fluid state, keep it from separating, render it antiputrescent and antiseptic, put the flesh of the animal under the influence of the antiseptic and color-restoring gases and fluids, or either, or both of them, and pack the meat in the prepared blood, either before or after it has been treated as specified.

Having now described the nature and extent of my invention, I claim and desire to secure by Letters Patent—

1. The blood of the animal, or the animal proteine compounds, treated substantially as set forth, by which it is made or maintained in a fluid state, kept from separating or putrefying, and rendered an antiseptic and preserving influence upon the animal meat or matter subjected to its action or influence.

2. The vegetable proteine compounds, treated substantially as set forth, by which they are rendered antiputrescent and an antiseptic and preserving influence upon animal flesh or tissue treated with or subjected to its influence.

3. Immersing, packing, or treating the carcass, flesh, or tissues of the animal with or into the blood thereof, or the proteine compounds, animal or vegetable, treated or prepared substantially as described, for the purpose of preserving the same.

4. Preparing the carcass or meat of the animal for the more effectual preservation of the same in or by the prepared blood or proteine compound or neutral solution, by introducing in the arterial and venous systems thereof an antiseptic gas or vapor, and an antiseptic fluid, either separately or in combination, or a gas, vapor, or fluid, which, being so introduced, will unite with, and exert an antiseptic and preserving influence upon, the flesh or tissues of the body, or any part thereof.

5. Combining the internal and external application of the aforesaid antiseptic influence to animal matter, for the purpose of preserving the same.

Dated New York, July 9, 1873.

G. W. SCOLLAY.

Witnesses:
  AMOS BROADNAX,
  JNO. B. MAYO.